US012761452B2

(12) United States Patent
Chen et al.

(10) Patent No.: US 12,761,452 B2
(45) Date of Patent: Oct. 13, 2026

(54) OPTICAL LENS

(71) Applicant: JIANGXI LIANCHUANG ELECTRONIC CO., LTD., Nanchang (CN)

(72) Inventors: Weijian Chen, Nanchang (CN); Yuxuan Xu, Nanchang (CN)

(73) Assignee: JANGXI LIANCHUANG ELECTRONIC CO., LTD., Nanchang (CN)

( * ) Notice: Subject to any disclaimer, the term of this patent is extended or adjusted under 35 U.S.C. 154(b) by 227 days.

(21) Appl. No.: 18/832,733

(22) PCT Filed: Jan. 17, 2023

(86) PCT No.: PCT/CN2023/072560
§ 371 (c)(1),
(2) Date: Jul. 24, 2024

(87) PCT Pub. No.: WO2023/143235
PCT Pub. Date: Aug. 3, 2023

(65) Prior Publication Data

US 2025/0102773 A1 Mar. 27, 2025

(30) Foreign Application Priority Data

Jan. 26, 2022 (CN) ......................... 202210090900.4

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01); *G02B 13/006* (2013.01)

(58) Field of Classification Search
CPC .............................. G02B 13/0045; G02B 9/62
See application file for complete search history.

(56) References Cited

U.S. PATENT DOCUMENTS

| | | | |
|---|---|---|---|
| 9,103,962 | B2 | 8/2015 | Liao et al. |
| 2014/0029115 | A1 | 1/2014 | Liao et al. |

(Continued)

FOREIGN PATENT DOCUMENTS

| | | | |
|---|---|---|---|
| CN | 204256248 | U | 4/2015 |
| CN | 107783256 | A | 3/2018 |

(Continued)

OTHER PUBLICATIONS

JPO, Office Action for JP Application No. 2024-543958, Jul. 4, 2025.

(Continued)

*Primary Examiner* — Joseph P Martinez
(74) *Attorney, Agent, or Firm* — Ming Jiang; OPENPTO US LLC

(57) ABSTRACT

An optical lens having six lenses along an optical axis from an object side to an image plane, sequentially comprises: a first negative optical power lens, first object side concave surface, second image side concave surface; a second negative optical power lens, third object side concave surface, fourth image side convex surface; a third positive optical power lens, fifth object side convex surface, sixth image side convex surface; a fourth positive optical power lens, seventh object side convex surface, eighth image side convex surface; a fifth negative optical power lens, ninth object side surface being concave, tenth image side convex surface; a sixth positive optical power lens, eleventh object side convex surface, and twelfth image side concave surface. Fourth and fifth lenses are adhered together to form a cemented lens. Real image height IH corresponding to maximal field of view and optical lens effective focal length f satisfy: $0.55<f/H<0.65$.

10 Claims, 10 Drawing Sheets

(56) References Cited

U.S. PATENT DOCUMENTS

| | | | | |
|---|---|---|---|---|
| 2016/0320613 | A1 | 11/2016 | Emi | |
| 2018/0203209 | A1 | 7/2018 | Chen et al. | |
| 2019/0064483 | A1* | 2/2019 | Chen | G02B 9/62 |
| 2019/0155006 | A1 | 5/2019 | Lin et al. | |
| 2019/0261834 | A1 | 8/2019 | Kawakami | |

FOREIGN PATENT DOCUMENTS

| | | | |
|---|---|---|---|
| CN | 108983401 | A | 12/2018 |
| CN | 109445077 | A | 3/2019 |
| CN | 109932807 | A | 6/2019 |
| CN | 110133823 | A | 8/2019 |
| CN | 110412722 | A | 11/2019 |
| CN | 111352214 | A | 6/2020 |
| CN | 111367046 | A | 7/2020 |
| CN | 111679408 | A | 9/2020 |
| CN | 112485889 | A | 3/2021 |
| CN | 212647128 | U | 3/2021 |
| CN | 113050256 | A | 6/2021 |
| CN | 113640973 | A | 11/2021 |
| CN | 113960754 | A | 1/2022 |
| CN | 114114649 | A | 3/2022 |
| JP | 2020046565 | A | 3/2020 |
| WO | 2021157959 | A1 | 8/2021 |

OTHER PUBLICATIONS

JPO, Notice of Allowance for JP Application No. 2024-543958, Jul. 18, 2025.

EPO, Search Report for EP Application No. 23746117.3, Apr. 4, 2025.

WIPO, International Search Report for PCT Application No. PCT/CN2023/072560, May 22, 2023.

CNIPA, First Office Action for CN Application No. 202210090900.4, Mar. 15, 2022.

CNIPA, Office Action issued for CN Application No. 202210090900.4, Mar. 25, 2022.

KIPO, Notice of Allowance KR Application No. 10-2024-7027260, Mar. 12, 2026.

* cited by examiner

OPTICAL LENS

CROSS-REFERENCE OF RELATED APPLICATION

This application is a national stage of International Application No. PCT/CN2023/072560, filed Jan. 17, 2023, which claims priority to China Patent Application No. 202210090900.4 filed Jan. 26, 2022, which are incorporated herein by reference in their entireties.

TECHNICAL FIELD

The disclosure relates to the technical field of imaging lenses, in particular to an optical lens.

BACKGROUND

In recent years, with the rapid development of the automatic driving assistance systems, image algorithms are upgrading. An automotive lens is a key component of the automatic driving assistance system to obtain external information, and it also needs to be upgraded to meet the requirements of the present stage.

At present, for obtaining information in a single direction, the conventional automatic driving assistance system generally depends on a long-focus lens and a wide-angle lens. Although the long-focus lens has a long focal length, it has a small field of view, and it is generally used to capture objects at a long-distance for observation. Although the wide-angle lens has a large field of view, it has a short focal length, and it is generally used to capture objects at a short-distance for observation. Therefore, there is a need to design an optical lens which integrates functions of the long-focus lens and the wide-angle lens, and has a large aperture, a large field of view and a high resolution, so as to replace multiple lenses each having a single function in the traditional automatic driving assistance system.

SUMMARY

Embodiments of the present disclosure provide an optical lens with a large aperture, a large field of view and a high resolution.

For this, the technical solutions of the present disclosure are provided as follows.

The embodiments of the present disclosure provide an optical lens including a total of six lenses. From an object side to an imaging plane along an optical axis of the optical lens, the optical lens sequentially includes: a first lens with a negative refractive power, both an object side surface and the image side surface of the first lens being concave; a second lens with a negative refractive power, an object side surface of the second lens being concave, and an image side surface of the second lens being convex; a third lens with a positive refractive power, both an object side surface and an image side surface of the third lens being convex; a fourth lens with a positive refractive power, both an object side surface and an image side surface of the fourth lens being convex; a fifth lens with a negative refractive power, an object side surface of the fifth lens being concave, and an image side surface of the fifth lens being convex; a sixth lens with a positive refractive power, an object side surface of the sixth lens is convex, and an image side surface of the sixth lens being concave. The fourth lens and the fifth lens are cemented to form a cemented lens. An effective focal length f of the optical lens and a true image height IH corresponding to a maximum field of view of the optical lens meet an expression: $0.55<f/IH<0.65$. An aperture HD1 of the object side surface of the first lens corresponding to half of the maximum field of view of the optical lens and an aperture D1 of the object side surface of the first lens corresponding to the maximum field of view meet an expression: $0.5<HD1/D1<0.6$.

Further, the effective focal length f of the optical lens meets an expression: $5.9\ mm<f<6.5\ mm$.

Further, the true image height IH corresponding to the maximum field of view of the optical lens meets an expression: $9.5\ mm<IH<10.5\ mm$.

Further, an f-number of the optical lens meets an expression: $1.7<FNO<1.9$.

Further, the effective focal length f of the optical lens and a focal length f1 of the first lens meet an expression: $-1.2<f1/f<-1.0$. A radius of curvature R1 of the object side surface of the first lens and a radius of curvature R2 of the image side surface of the first lens meet an expression: $0.8<(R1+R2)/(R1-R2)<0.9$.

Further, the effective focal length f of the optical lens and a focal length f2 of the second lens meet an expression: $-18.5<f2/f<-11.5$. A radius of curvature R3 of the object side surface of the second lens, a radius of curvature R4 of the image side surface of the second lens, and a central thickness CT2 of the second lens meet an expression: $1.05<R3/(R4+CT2)<1.20$.

Further, the effective focal length f of the optical lens, a focal length f3 of the third lens, and a radius of curvature R5 of the object side surface of the third lens meet expressions: $2.0<f3/f<2.2$, and $1.10<R5/f3<1.25$.

Further, the effective focal length f of the optical lens and a focal length f4 of the fourth lens meet an expression: $1.2<f4/f<1.9$.

Further, the effective focal length f of the optical lens and a focal length f5 of the fifth lens, a radius of curvature R9 of the object side surface of the fifth lens, and a radius of curvature R10 of the image side surface of the fifth lens meet expressions: $-2.2<f5/f<-1.8$, and $1.10<R10/(R9+f5)<1.35$.

Further, the effective focal length f of the optical lens and a focal length f6 of the sixth lens, a radius of curvature R11 of the object side surface of the sixth lens and a radius of curvature R12 of the image side surface of the sixth lens meet expressions: $2.8<f6/f<3.9$, and $-3.0<(R11+R12)/(R11-R12)<-1.0$.

A part of additional aspects and advantages of the present disclosure are set forth in part in the description below, and a part thereof would become apparent from the description below, or may be learned by practice of the present disclosure.

BRIEF DESCRIPTION OF THE DRAWINGS

The above and/or additional aspects and advantages of the present disclosure would become apparent and easily understood from the following description of the embodiments in combination with the drawings, in which.

Figure 1:
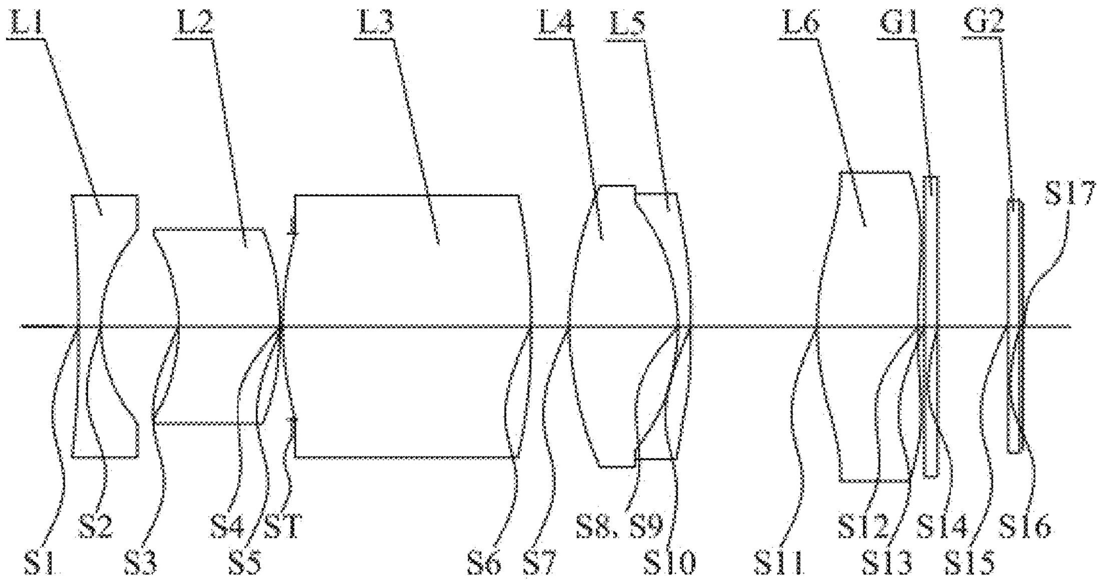
FIG. 1 is a schematic diagram illustrating a structure of an optical lens according to Embodiment 1 of the present disclosure.

The disclosure will be further described by the following specific embodiments in combination with the accompanying drawings.

DETAILED DESCRIPTION OF PREFERRED EMBODIMENTS

In order to better understand the disclosure, various aspects of the present disclosure will be described in more detail with reference to the drawings. It is understandable that these detailed descriptions are only descriptions of embodiments of the present disclosure, which are not intended to limit the scope of the present disclosure in any way. Throughout the specification, the same reference numerals refer to the same elements. The expression “and/or” includes any and all combinations of one or more of related listed items.

It is notable that, in the specification, the expressions of “first”, “second”, “third”, etc. are only used to distinguish one feature from another, and do not mean any limitation on the features. Therefore, a first lens discussed below may also be called as a second lens or a third lens without departing from the teaching of the present disclosure.

In the drawings, for convenience of explanation, the thickness, size and shape of the lenses are slightly exaggerated. Specifically, spherical shapes or aspherical shapes illustrated in the drawings are exemplary. That is, the spherical shape(s)) or aspherical shape(s) are not limited to those illustrated in the drawings. The drawings are only exemplary and are not drawn strictly to scale.

Herein, a paraxial region refers to a region near the optical axis. If a surface of the lens is convex and a convex position of the surface is not defined, it means that the surface of the lens is convex at least in the paraxial region. If a surface of the lens is concave and a concave position of the surface is not defined, it means that the surface of the lens is concave at least in the paraxial region. A surface of each lens closest to the to-be-captured object is referred to as an object side surface of the lens, and a surface of each lens closest to the imaging plane is referred to as an image side surface of the lens.

It is notable that the embodiments of the present disclosure and the features in the embodiments may be combined with each other without conflict. The present disclosure will be described in detail with reference to the drawings and embodiments hereafter.

An optical lens provided in the embodiments of the present disclosure includes sequentially, from an object side surface to an imaging surface: a first lens, a second lens, a third lens, a fourth lens, a fifth lens and a sixth lens.

In some embodiments, the first lens has a negative refractive power, and has a concave object side surface and a concave image side surface. Such refractive power and surfaces of the first lens are beneficial to collect light from a large field of view as much as possible to enter the following optical lenses.

In some embodiments, the second lens has a negative refractive power, and has a concave object side surface and a convex image side surface. Such refractive power and surfaces of the second lens are beneficial to collect the light incident from the first lens, and make a travel path of the light have a smooth transition. This is also beneficial to reduce a front aperture of the optical lens, and reduce a volume of the optical lens, which is helpful in miniaturization of the optical lens and reduction of the cost.

In some embodiments, the third lens has a positive refractive power, and has a convex object side surface and a convex image side surface. Such refractive power and surfaces of the third lens are beneficial to converge the light, and make the diverged lights enter the subsequent light path, that is, a smooth transition is provided in the travel path of the light.

In some embodiments, the fourth lens has a positive refractive power, and has a convex object side surface and a convex image side surface. Such refractive power and surfaces of the fourth lens are beneficial to converge the light, and make the diverged lights enter the subsequent light path, that is, a smooth transition is further provided in the travel path of the light.

In some embodiments, the fifth lens has a negative refractive power, and has a concave object side surface and a convex image side surface. Such refractive power and surfaces of the fifth lens plays a certain role in correcting aberration, and are beneficial to avoid the light from being too divergent in the subsequent light path.

In some embodiments, the image side surface of the fourth lens and the object side surface of the fifth lens are cemented to each other. By combining the fourth lens and the fifth lens into a cemented lens, it takes charge of the overall chromatic aberration correction of the optical system, and effectively corrects the aberration. It also alleviates problems of tolerance sensitivity such as tilt/off-of-center of the lenses caused during assembly, and improves the production yield.

In some embodiments, the sixth lens has a positive refractive power and has a convex object side surface and a concave image side surface. Such refractive power and surfaces of the sixth lens are beneficial to effectively transmit more light to the imaging plane, correct astigmatism and field curvature, and improve the image resolving ability of the optical lens. The sixth lens has aspherical surfaces, which is beneficial to the flatness of the surfaces, and can eliminate the aberration that occurs during imaging, thus improving the imaging quality of the optical lens.

In some embodiments, a stop is provided between the second lens and the fourth lens, and the stop is configured to limit the beam of the light. This further improves the imaging quality of the optical lens. When the stop is provided between the second lens and the fourth lens, it is beneficial to gather the light entering the optical system, and reduce the front aperture of the optical lens.

In some embodiments, an effective focal length f of the optical lens meets an expression: 5.9 mm<f<6.5 mm. This is helpful to improve the ability of the lens in highlighting a subject and an ability in shooting a distant scene.

In some embodiments, an f-number of the optical lens meet an expression: 1.7<FNO<1.9. This ensures an illuminance at an edge imaging region of the optical lens while having both a long focal length and a large field of view.

In some embodiments, a true image height IH corresponding to the maximum field of view meets an expression: 9.5 mm<IH<10.5 mm. This is beneficial to realize an imaging effect of a large imaging plane of the optical lens, thus having high optical performance. It can further enable the optical lens to match image sensors of different specifications.

In some embodiments, a chief ray angle CRA on the imaging plane at a full field of view of the optical lens meets an expression: 0°<CRA<6.5°. This can bring a large allowable error between the CRA of the optical lens and a CRA of a chip sensor, and can also ensure the illumination at an edge imaging region.

In some embodiments, the effective focal length f of the optical lens and the true image height IH corresponding to the maximum field of view meets an expression: 0.55<f/IH<0.65. This can ensure that the optical lens has a large imaging surface, and meets an imaging requirement of a chip having a large target plane.

In some embodiments, a sum ΣCT of center thicknesses of all the lenses and a total track length TTL of the optical lens meet an expression: 0.55<ΣCT/TTL<0.70. This is beneficial to short the total length of the optical lens.

In some embodiments, an aperture HD1 of the object side surface of the first lens corresponding to half of the maximum field of view of the optical lens and an aperture D1 of the object side surface of the first lens corresponding to the maximum field of view meet an expression: 0.5<HD1/D1<0.6. This can ensure that a central field of view of the optical lens is concentrated near the optical axis, enable coma and astigmatism to be reduced as much as possible, and also enable a great illumination of an edge field of view.

In some embodiments, the effective focal length f of the optical lens and a focal length f1 of the first lens meet an expression: −1.2<f1/f<−1.0. This enables the first lens to have a small negative refractive power, and is beneficial to increase the back focal length of the optical lens.

In some embodiments, the effective focal length f of the optical lens and a focal length f2 of the second lens meet an expression: −18.5<f2/f<−11.5. This enables the second lens to have a large negative refractive power, which is beneficial to balance the astigmatism and field curvature of the optical lens.

In some embodiments, the effective focal length f of the optical lens and a focal length f3 of the third lens meet an expression: 2.0<f3/f<2.2. This enables the third lens to have a small positive refractive power, which is beneficial to balance various aberrations of the optical lens.

In some embodiments, the effective focal length f of the optical lens and a focal length f4 of the fourth lens meet an expression: 1.2<f4/f<1.9. This enables the fourth lens to have a small positive refractive power, which is beneficial to balance various aberrations of the optical lens.

In some embodiments, the effective focal length f of the optical lens and a focal length f5 of the fifth lens meet an expression: −2.2<f5/f<−1.8. This enables the fifth lens to have a small negative refractive power, which is beneficial to correct the aberration caused its previous lenses, and avoid the light from being too divergent in the subsequent light path.

In some embodiments, the effective focal length f of the optical lens and a focal length f6 of the sixth lens meet an expression: 2.8<f6/f<3.9. This enables the sixth lens to have a large positive refractive power, which is beneficial to balance the astigmatism and field curvature of the optical lens.

In some embodiments, a radius of curvature R1 of the object side surface of the first lens and a radius of curvature R2 of the image side surface of the first lens meet an expression: 0.8< (R1+R2)/(R1−R2)<0.9. This is beneficial to increase the field of view of the optical lens, balance the spherical aberration and field curvature of the optical lens, and improve the imaging quality of the optical lens.

In some embodiments, a radius of curvature R3 of the object side surface, a radius of curvature R4 of the image side surface of the second lens, and a central thickness CT2 of the second lens meet an expression: 1.05<R3/(R4+CT2)<1.20. This is beneficial to make shapes of the object-side surface and the image side surface of the second lens be approximately concentric circles, balance the astigmatism and field curvature generated by the second lens, and improve the imaging quality of the optical lens.

In some embodiments, a radius of curvature R5 of the object side surface of the third lens and the focal length f3 of the third lens in the optical lens meet an expression: 1.10<R5/f3<1.25. This is beneficial to reduce a sensitivity of the third lens, balance various aberrations of the optical lens, and improve the imaging quality of the optical lens.

In some embodiments, a radius of curvature R9 of the object side surface of the fifth lens, a radius of curvature R10 of the image side surface of the fifth lens and the focal length f5 of the fifth lens meet an expression: 1.10<R10/(R9+f5)<1.35. This is beneficial to control the refraction angle of the light at the fifth lens, balance various aberrations generated by the fifth lens, and improve the imaging quality of the optical lens.

In some embodiments, a radius of curvature R11 of the object side surface and a radius of curvature R12 of the image side surface of the sixth lens in the optical lens meet an expression: −2.0<(R11+R12)/(R11−R12)<−1.0. This enables the image side surface of the sixth lens to be flat, enables a distortion at an edge of the optical lens to be optimized, balances the field curvature of the optical lens, corrects the astigmatism, and improves the imaging quality of the optical lens.

In some embodiments, a center thickness CT3 of the third lens and the total track length TTL of the optical lens meet an expression: 0.08≤CT3/TTL≤0.26. This is beneficial to correct the field curvature by the thick third lens.

In some embodiments, a center thickness CT4 of the fourth lens and the total track length TTL of the optical lens meet an expression: 0.11≤CT4/TTL≤0.16. This is beneficial to correct the field curvature by the thick fourth lens.

In some embodiments, a center thickness CT6 of the sixth lens and the total track length TTL of the optical lens meet an expression: 0.11≤CT6/TTL≤0.2. This is beneficial to correct the field curvature by the thick sixth lens.

In order to make the optical system have good optical performances, multiple aspheric lenses are used in the optical lens, and a shape of each aspheric surface of the optical lens meets the following equation:

$$z = \frac{ch^2}{1+\sqrt{1-(1+K)c^2h^2}} + Ah^2 + Bh^4 + Ch^6 + Dh^8 + Eh^{10} + Fh^{12}$$

where Z represents a distance between a position on the surface and a vertex of the surface along the optical axis, h represents a distance from the optical axis to the position on the surface, c represents the curvature of the vertex of the surface, K represents a quadratic surface coefficient, A represents a second-order surface coefficient, B represents a fourth-order surface coefficient, C represents a sixth-order surface coefficient, D represents an eighth-order surface coefficient, E represents a tenth-order surface coefficient, and F represents a twelfth-order surface coefficient.

The present disclosure will be further described below in several embodiments below. In the various embodiments, the thickness, the radius of curvature, and the material selection of each lens in the optical lens are different, which may refer to the parameter table of the respective embodiments. The following embodiments just illustrate preferred implementations of the present disclosure. However, the implementations of the present disclosure are not limited only by the following embodiments, and any other variations, substitutions, combinations or simplifications, that are made without departing from the concept of the present disclosure, should be regarded as equivalent implementations, and fall within the protection scope of the present disclosure.

Embodiment 1

Referring to FIG. 1, the structure of an optical lens provided in Embodiment 1 of the present disclosure is illustrated. From an object side to an imaging plane along an optical axis, the optical lens sequentially includes: a first lens L1, a second lens L2, a stop ST, a third lens L3, a fourth lens L4, a fifth lens L5, a sixth lens L6, a filter G1 and a protective glass G2.

The first lens L1 has a negative refractive power. The object side surface S1 of the first lens L1 is concave, and the image side surface S2 of the first lens is concave. The second lens L2 has a negative refractive power. The object side surface S3 of the second lens L2 is concave, and the image side surface S4 of the second lens L2 is convex. Then is the stop ST. The third lens L3 has a positive refractive power. Both the object side surface S5 and the image side surface S6 of the third lens L3 are convex. The fourth lens L4 has a positive refractive power. Both the object side surface S7 and the image side surface S8 of the fourth lens L4 are convex. The fifth lens L5 has a negative refractive power. The object side surface S9 of the fifth lens L5 is concave, and the image side surface S10 of the fifth lens L5 is convex. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 1 of the present disclosure are shown in Table 1-1.

TABLE 1-1

| Surface No. | | Surface type | Radius of curvature R (mm) | Thickness D/ Distance L(mm) | Refractive index Nd | Abbe number Vd |
|---|---|---|---|---|---|---|
| | Object plane | Plane | Infinity | Infinity | | |
| S1 | First lens | Spherical surface | −71.51 | 1.00 | 1.76 | 52.34 |
| S2 | | Spherical surface | 5.86 | 3.27 | | |
| S3 | Second lens | Spherical surface | −7.47 | 4.31 | 1.50 | 81.61 |
| S4 | | Spherical surface | −10.80 | 0.51 | | |
| ST | Stop | Plane | Infinity | −0.41 | | |
| S5 | Third lens | Spherical surface | 14.89 | 10.48 | 1.88 | 40.81 |
| S6 | | Spherical surface | −27.56 | 1.67 | | |
| S7 | Fourth lens | Spherical surface | 13.71 | 4.59 | 1.50 | 81.61 |
| S8/S9 | Fifth lens | Spherical surface | −7.92 | 0.53 | 1.95 | 17.94 |
| S10 | | Spherical surface | −23.51 | 5.40 | | |
| S11 | Sixth lens | Aspheric surface | 12.96 | 4.28 | 1.81 | 40.73 |
| S12 | | Aspheric surface | 57.68 | 0.25 | | |

TABLE 1-1-continued

| Surface No. | | Surface type | Radius of curvature R (mm) | Thickness D/ Distance L(mm) | Refractive index Nd | Abbe number Vd |
|---|---|---|---|---|---|---|
| S13 | Filter | Plane | Infinity | 0.50 | 1.52 | 64.20 |
| S14 | | Plane | Infinity | 3.00 | | |
| S15 | Protective | Plane | Infinity | 0.50 | 1.52 | 64.20 |
| S16 | glass | Plane | Infinity | 0.13 | | |
| S17 | Imaging plane | Plane | Infinity | | | |

The parameters of surfaces of the aspheric lenses in the optical lens provided in Embodiment 1 of the present disclosure are shown in Table 1-2.

TABLE 1-2

| Surface No. | K | A | B | C | D | E | F |
|---|---|---|---|---|---|---|---|
| S11 | −15.29 | 0.00E+00 | 5.94E−04 | −3.05E−05 | 8.18E−07 | −1.62E−08 | 1.32E−10 |
| S12 | −0.52 | 0.00E+00 | −3.29E−04 | −8.10E−06 | 1.72E−07 | −2.75E−09 | 2.58E−11 |

Figure 2:
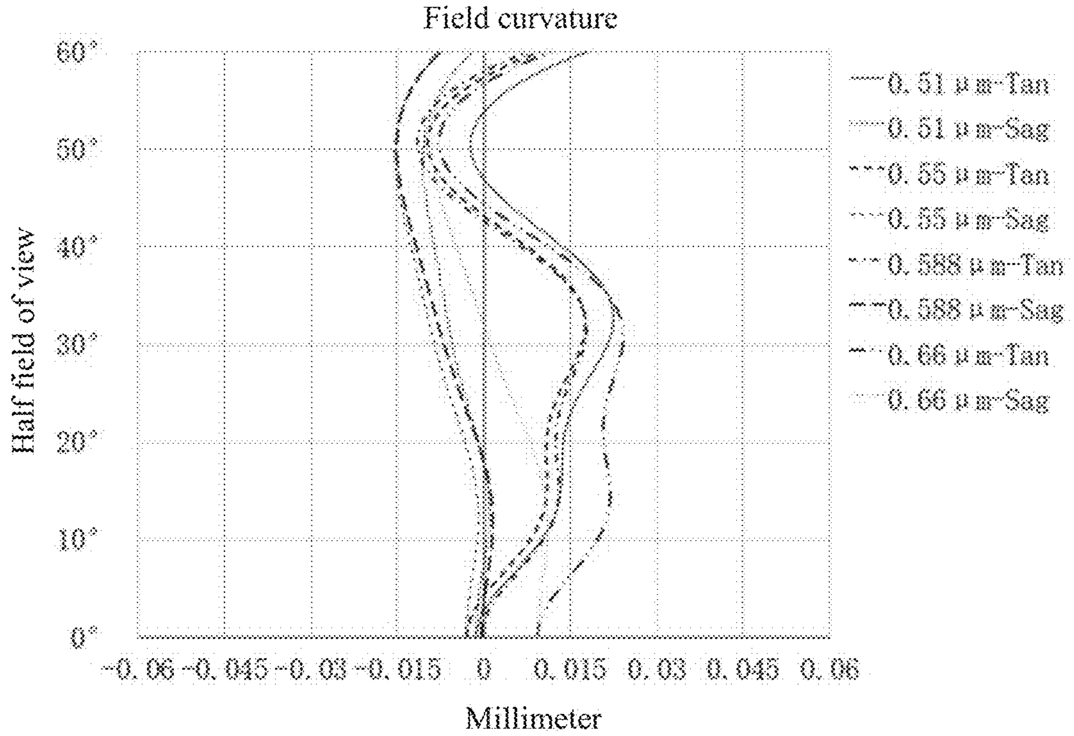
FIG. 2 is a graph of field curvatures of the optical lens according to Embodiment 1 of the present disclosure.
Figure 3:
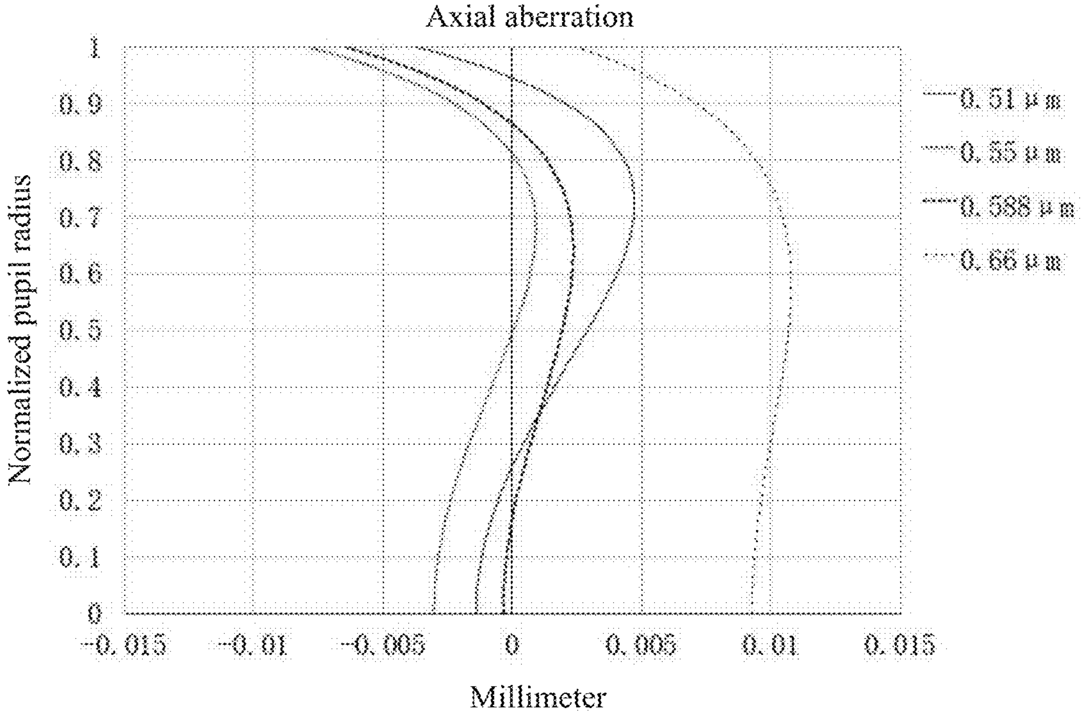
FIG. 3 is a graph of axial aberrations of the optical lens according to Embodiment 1 of the present disclosure.
Figure 4:
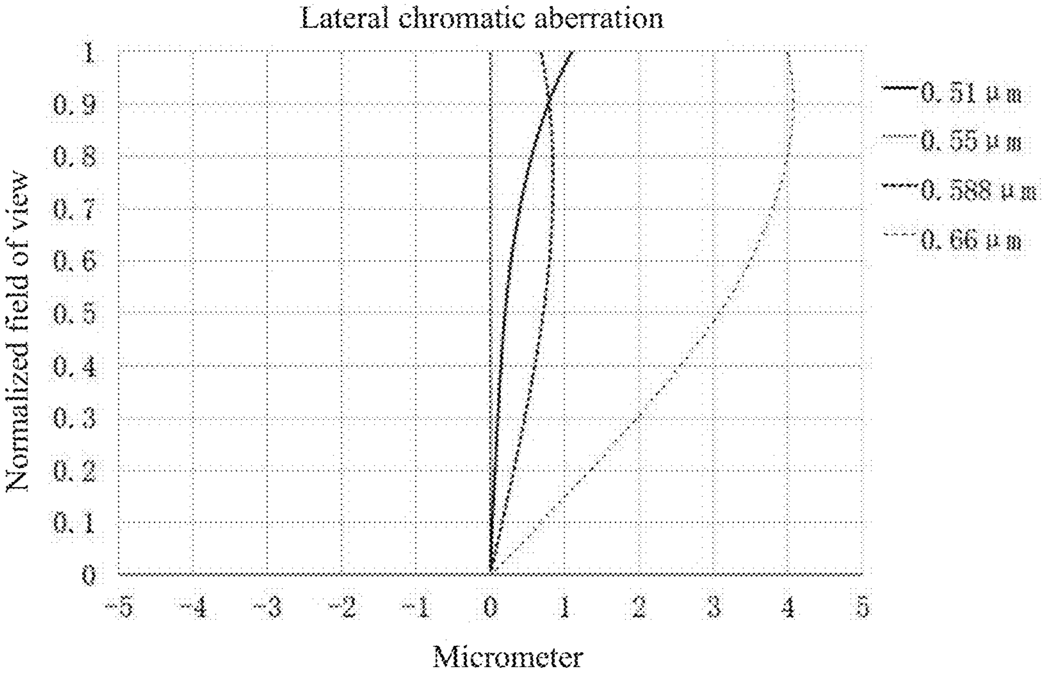
FIG. 4 is a graph of lateral chromatic aberrations of the optical lens according to Embodiment 1 of the present disclosure.
Figure 5:
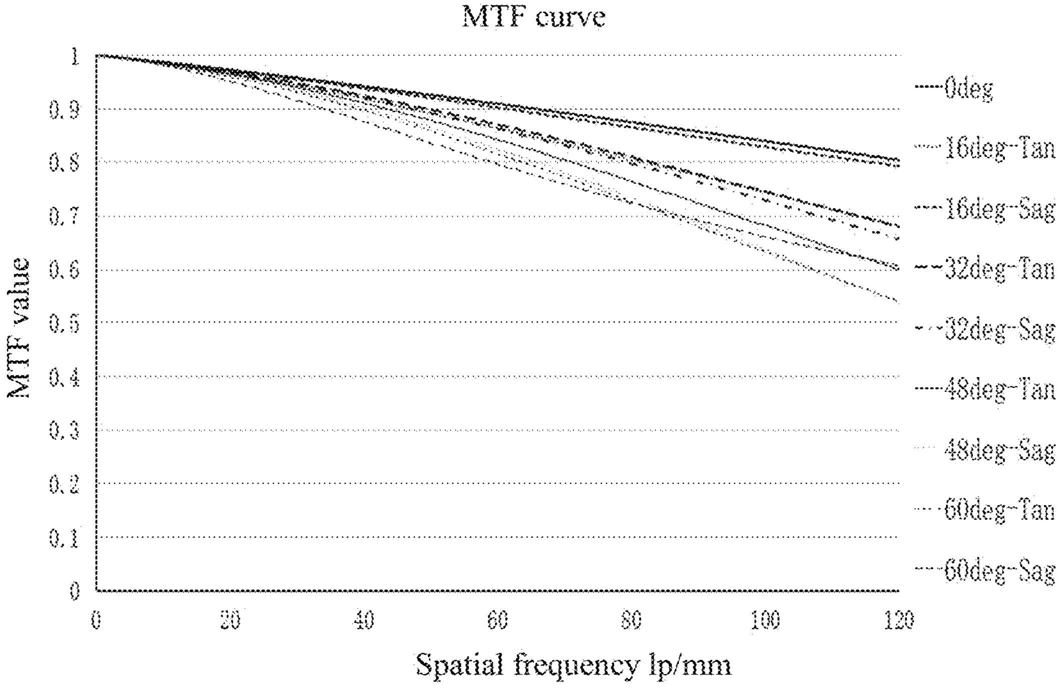
FIG. 5 is a graph of Modulation Transfer Function (MTF) of the optical lens according to Embodiment 1 of the present disclosure.

In the embodiment, the field curvature curves of the optical lens are shown in FIG. 2, the axial aberration curves of the optical lens are shown in FIG. 3, the lateral chromatic aberration curves of the optical lens are shown in FIG. 4, and the MTF curves of the optical lens are shown in FIG. 5.

The field curvature curves of Embodiment 1 are illustrated in FIG. 2, which represent curvature degrees of light at different wavelengths on a meridional plane and a sagittal plane. The horizontal axis represents an offset (unit: millimeter), and the vertical axis represents a half field of view (unit: degree)) (°. It can be seen from the graph that the field curvatures of the meridional plane and the sagittal plane are within +0.03 mm, which shows that the field curvatures of the optical lens are well corrected.

The axial aberration curves of Embodiment 1 are illustrated in FIG. 3, which represent aberrations on the optical axis at the imaging plane. The horizontal axis represents the axial aberration (unit: millimeter), and the vertical axis represents the normalized pupil radius. It can be seen from the graph that an offset of the axial aberration is within +0.015 mm, which shows that optical lens can effectively correct the axial aberration thereof.

The lateral chromatic aberration curves of Embodiment 1 are illustrated in FIG. 4, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within +5 μm, which shows that the optical lens can effectively correct the chromatic aberration of the edge field of view and the secondary spectrum of the entire imaging plane.

The MTF curves of Embodiment 1 are illustrated in FIG. 5, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-120) lp/mm, the MTF curves uniformly and smoothly decrease from the center to the edge field of view. A good imaging quality and a good detail resolution capability are all enabled at either a low frequency or a high frequency.

Embodiment 2

Figure 6:
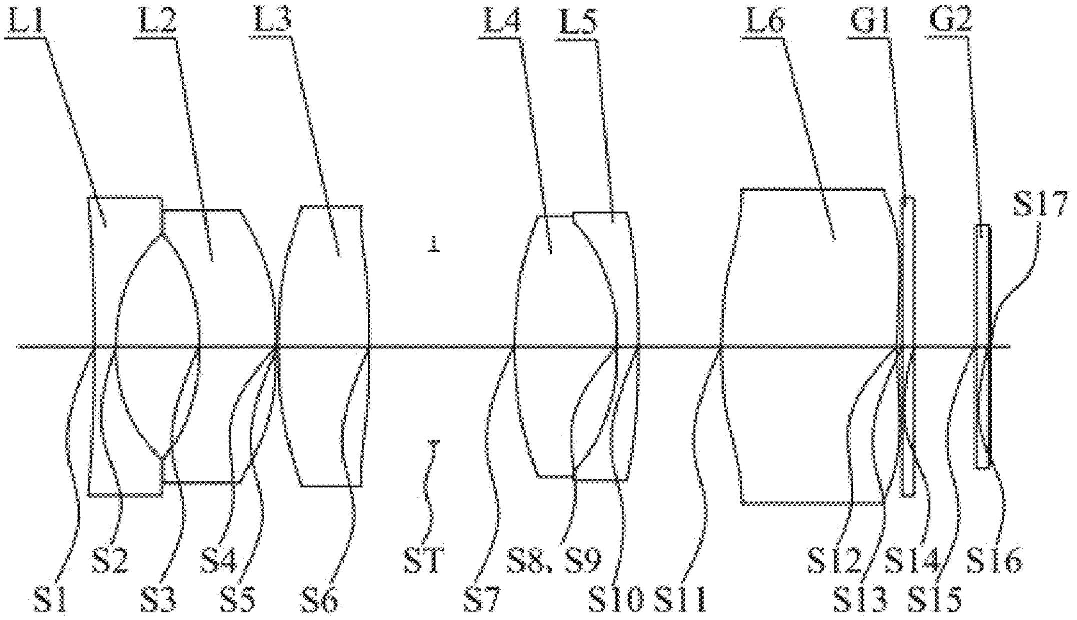
FIG. 6 is a schematic view illustrating a structure of an optical lens according to Embodiment 2 of the present disclosure.

Referring to FIG. 6, the structure of the optical lens provided in Embodiment 2 of the present disclosure is illustrated. From an object side to an imaging plane along an optical axis, the optical lens sequentially includes: a first lens L1, a second lens L2, a third lens L3, a stop ST, a fourth lens L4, a fifth lens L5, a sixth lens L6, a filter G1 and a protective glass G2.

The first lens L1 has a negative refractive power. The object side surface S1 of the first lens L1 is concave, and the image side surface S2 of the first lens is concave. The second lens L2 has a negative refractive power. The object side surface S3 of the second lens L2 is concave, and the image side surface S4 of the second lens L2 is convex. The third lens L3 has a positive refractive power. Both the object side surface S5 and the image side surface S6 of the third lens L3 are convex. Then is the stop ST. The fourth lens L4 has a positive refractive power. Both the object side surface S7 and the image side surface S8 of the fourth lens L4 are convex. The fifth lens L5 has a negative refractive power. The object side surface S9 of the fifth lens L5 is concave, and the image side surface S10 of the fifth lens L5 is convex. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 2 of the present disclosure are shown in Table 2-1.

TABLE 2-1

| Surface No. | | Surface type | Radius of curvature R (mm) | Thickness D/ Distance L(mm) | Refractive index Nd | Abbe number Vd |
|---|---|---|---|---|---|---|
| | Object plane | Plane | Infinity | Infinity | | |
| S1 | First lens | Spherical surface | −79.42 | 1.00 | 1.84 | 42.73 |
| S2 | | Spherical surface | 6.24 | 3.64 | | |
| S3 | Second lens | Spherical surface | −7.29 | 3.46 | 1.73 | 54.67 |
| S4 | | Spherical surface | −10.19 | 0.10 | | |
| S5 | Third lens | Spherical surface | 15.99 | 4.02 | 1.91 | 35.25 |
| S6 | | Spherical surface | −42.59 | 2.93 | | |
| ST | Stop | Plane | Infinity | 3.66 | | |
| S7 | Fourth lens | Spherical surface | 14.30 | 4.50 | 1.60 | 65.46 |
| S8/S9 | Fifth lens | Spherical surface | −7.88 | 0.98 | 1.95 | 17.94 |
| S10 | | Spherical surface | −26.54 | 3.74 | | |
| S11 | Sixth lens | Aspheric surface | 14.83 | 7.92 | 1.81 | 40.73 |
| S12 | | Aspheric surface | 238.10 | 0.13 | | |
| S13 | Filter | Plane | Infinity | 0.50 | 1.52 | 64.20 |
| S14 | | Plane | Infinity | 2.79 | | |
| S15 | Protective | Plane | Infinity | 0.50 | 1.52 | 64.20 |
| S16 | glass | Plane | Infinity | 0.13 | | |
| S17 | Imaging plane | Plane | Infinity | | | |

The parameters of surfaces of the aspheric lenses in the optical lens provided in Embodiment 2 of the present disclosure are shown in Table 2-2.

TABLE 2-2

| Surface No. | K | A | B | C | D | E | F |
|---|---|---|---|---|---|---|---|
| S11 | −2.89 | 0.00E+00 | −9.51E−05 | −1.71E−06 | 2.26E−08 | −1.39E−09 | 9.50E−12 |
| S12 | −33.60 | 0.00E+00 | −4.32E−04 | −4.07E−06 | 7.88E−08 | −1.69E−10 | −2.72E−12 |

Figure 7:
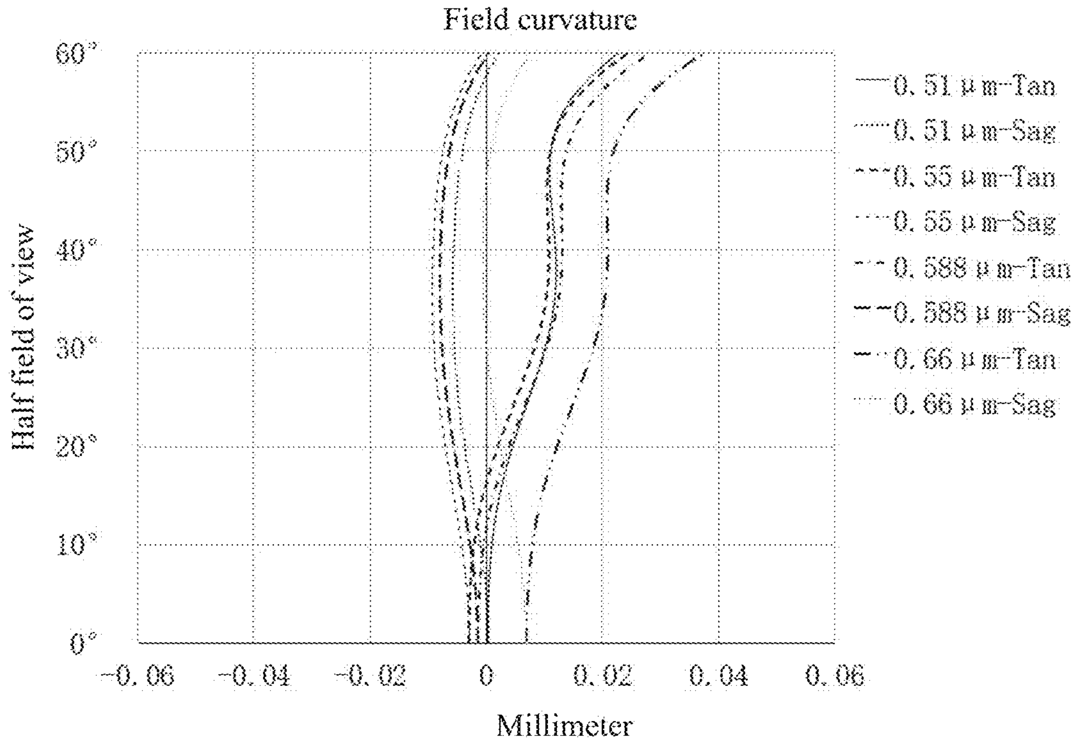
FIG. 7 is a graph of field curvatures of the optical lens according to Embodiment 2 of the present disclosure.
Figure 8:
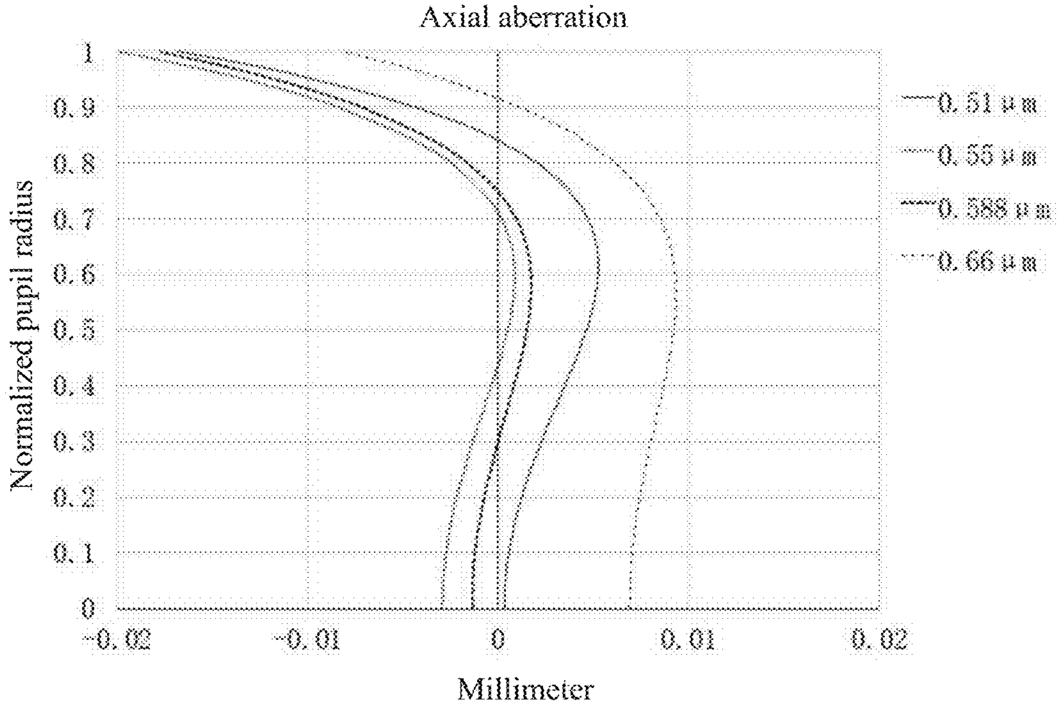
FIG. 8 is a graph of axial aberrations of the optical lens according to Embodiment 2 of the present disclosure.
Figure 9:
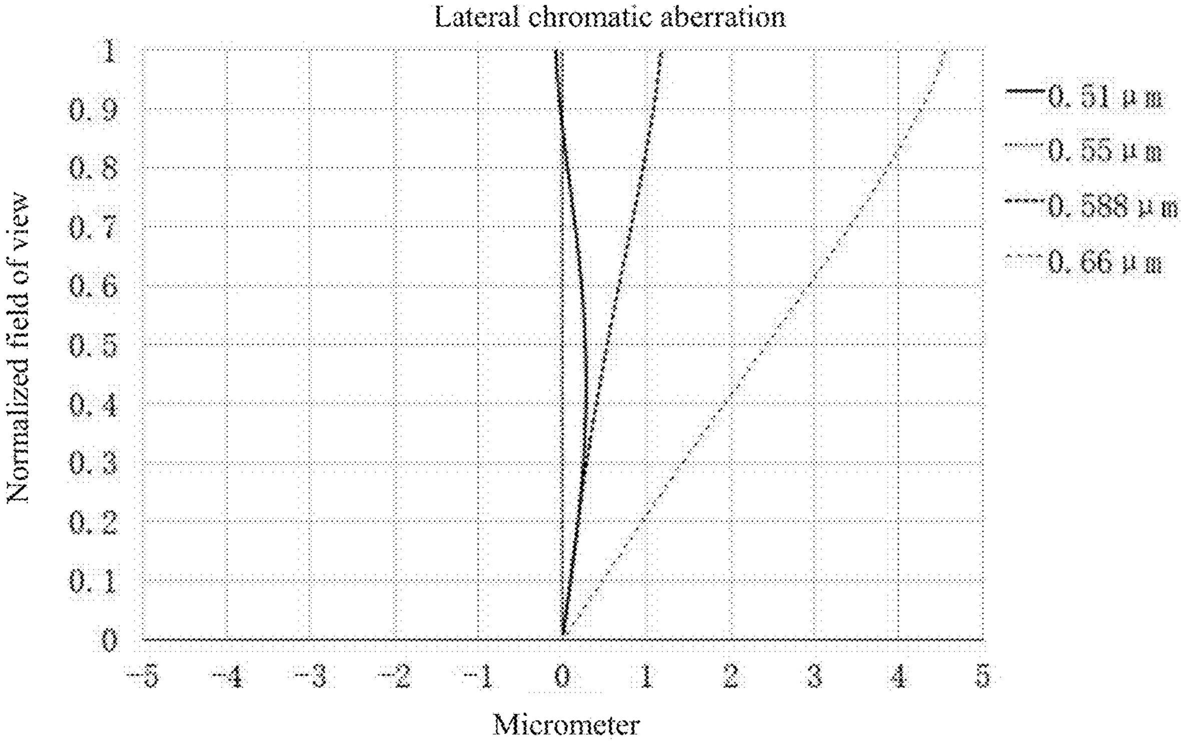
FIG. 9 is a graph of lateral chromatic aberrations of the optical lens according to Embodiment 2 of the present disclosure.
Figure 10:
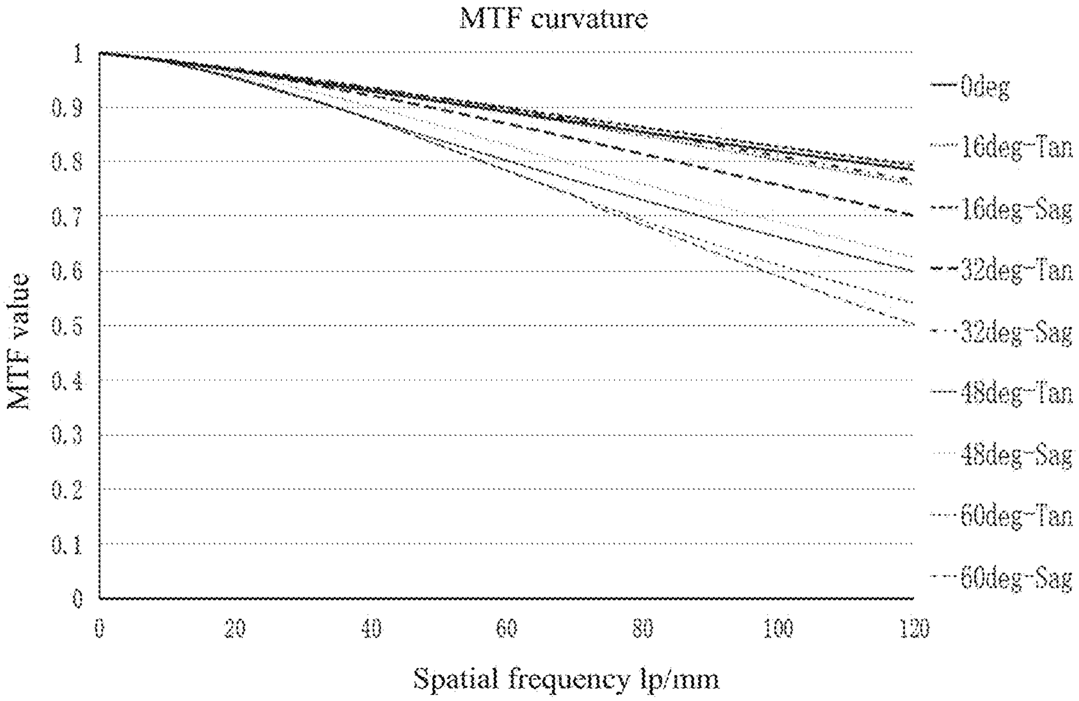
FIG. 10 is a graph of MTF of the optical lens according to Embodiment 2 of the present disclosure.

In the embodiment, the field curvature curves of the optical lens are shown in FIG. 7, the axial aberration curves of the optical lens are shown in FIG. 8, the lateral chromatic aberration curves of the optical lens are shown in FIG. 9, and the MTF curves of the optical lens are shown in FIG. 10.

The field curvature curves of Embodiment 2 are illustrated in FIG. 7, which represent curvature degrees of light at different wavelengths on a meridional plane and a sagittal plane. The horizontal axis represents an offset (unit: millimeter), and the vertical axis represents a half field of view (unit: degree)) (°. It can be seen from the graph that the field curvatures of the meridional plane and the sagittal plane are within +0.04 mm, which shows that the field curvatures of the optical lens are well corrected.

The axial aberration curves of Embodiment 2 are illustrated in FIG. 8, which represent aberrations on the optical axis at the imaging plane. The horizontal axis represents the axial aberration (unit: millimeter), and the vertical axis represents the normalized pupil radius. It can be seen from the graph that an offset of the axial aberration is within +0.02 mm, which shows that optical lens can effectively correct the axial aberration thereof.

The lateral chromatic aberration curves of Embodiment 2 are illustrated in FIG. 9, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within +5 μm, which shows that the optical lens can effectively correct the chromatic aberration of the edge field of view and the secondary spectrum of the entire imaging plane.

The MTF curves of Embodiment 2 are illustrated in FIG. 10, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-120) lp/mm, the MTF curves uniformly and smoothly decrease from the center to the edge field of view. A good imaging quality and a good detail resolution capability are all enabled at either a low frequency or a high frequency.

Embodiment 3

Figure 11:
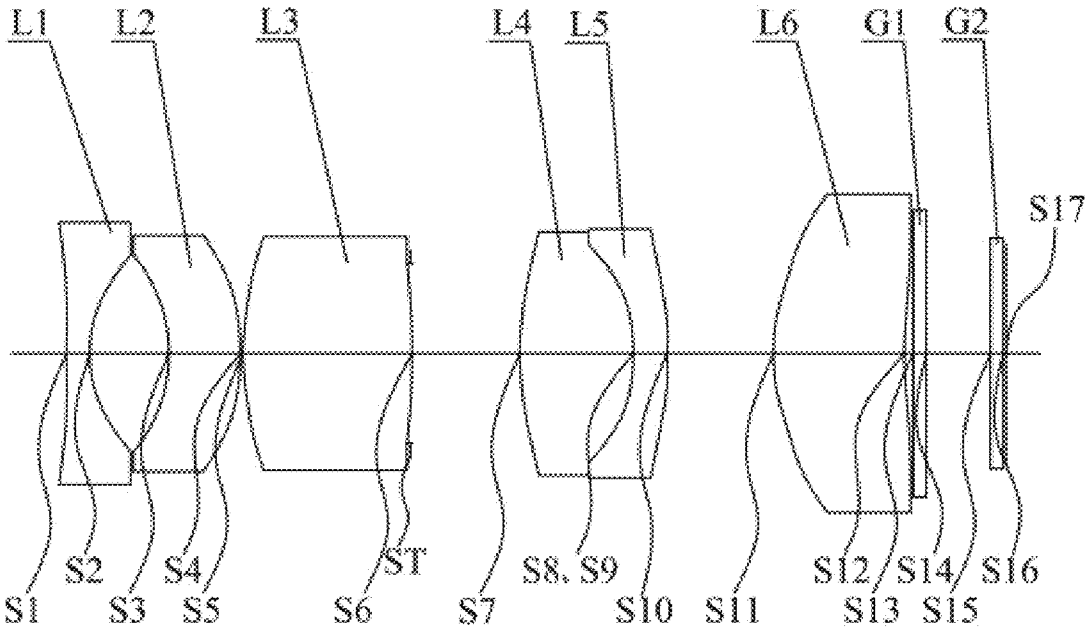
FIG. 11 is a schematic view illustrating a structure of an optical lens according to Embodiment 3 of the present disclosure.

Referring to FIG. 11, the structure of the optical lens provided in Embodiment 3 of the present disclosure is illustrated. From an object side to an imaging plane along an optical axis, the optical lens sequentially includes: a first lens L1, a second lens L2, a third lens L3, a stop ST, a fourth lens L4, a fifth lens L5, a sixth lens L6, a filter G1 and a protective glass G2.

The first lens L1 has a negative refractive power. The object side surface S1 of the first lens L1 is concave, and the image side surface S2 of the first lens is concave. The second lens L2 has a negative refractive power. The object side surface S3 of the second lens L2 is concave, and the image side surface S4 of the second lens L2 is convex. The third lens L3 has a positive refractive power. Both the object side surface S5 and the image side surface S6 of the third lens L3 are convex. Then is the stop ST. The fourth lens L4 has a positive refractive power. Both the object side surface S7 and the image side surface S8 of the fourth lens L4 are convex. The fifth lens L5 has a negative refractive power. The object side surface S9 of the fifth lens L5 is concave, and the image side surface S10 of the fifth lens L5 is convex. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 3 of the present disclosure are shown in Table 3-1.

TABLE 3-1

| Surface No. | | Surface type | Radius of curvature R (mm) | Thickness D/ Distance L(mm) | Refractive index Nd | Abbe number Vd |
|---|---|---|---|---|---|---|
| | Object plane | Plane | Infinity | Infinity | | |
| S1 | First lens | Spherical surface | −60.82 | 1.00 | 1.84 | 42.73 |
| S2 | | Spherical surface | 6.24 | 3.36 | | |
| S3 | Second lens | Spherical surface | −6.89 | 3.07 | 1.73 | 54.67 |
| S4 | | Spherical surface | −9.02 | 0.10 | | |
| S5 | Third lens | Spherical surface | 14.80 | 7.18 | 1.91 | 35.25 |
| S6 | | Spherical surface | −38.27 | 0.06 | | |
| ST | Stop | Plane | Infinity | 4.56 | | |
| S7 | Fourth lens | Spherical surface | 17.82 | 4.84 | 1.60 | 65.46 |
| S8/S9 | Fifth lens | Spherical surface | −6.99 | 1.38 | 1.95 | 17.94 |
| S10 | | Spherical surface | −22.31 | 4.60 | | |
| S11 | Sixth lens | Aspheric surface | 10.75 | 5.63 | 1.81 | 40.73 |
| S12 | | Aspheric surface | 35.23 | 0.33 | | |
| S13 | Filter | Plane | Infinity | 0.50 | 1.52 | 64.20 |
| S14 | | Plane | Infinity | 2.79 | | |
| S15 | Protective | Plane | Infinity | 0.50 | 1.52 | 64.20 |
| S16 | glass | Plane | Infinity | 0.13 | | |
| S17 | Imaging plane | Plane | Infinity | | | |

The parameters of surfaces of the aspheric lenses in the optical lens provided in Embodiment 3 of the present disclosure are shown in Table 3-2.

TABLE 3-2

| Surface No. | K | A | B | C | D | E | F |
|---|---|---|---|---|---|---|---|
| S11 | −1.32 | 0.00E+00 | 3.53E−05 | −2.49E−07 | 2.51E−08 | −5.86E−10 | 3.32E−12 |
| S12 | 6.82 | 0.00E+00 | −1.80E−04 | −3.44E−06 | 5.44E−08 | −7.28E−10 | 6.34E−12 |

Figure 12:
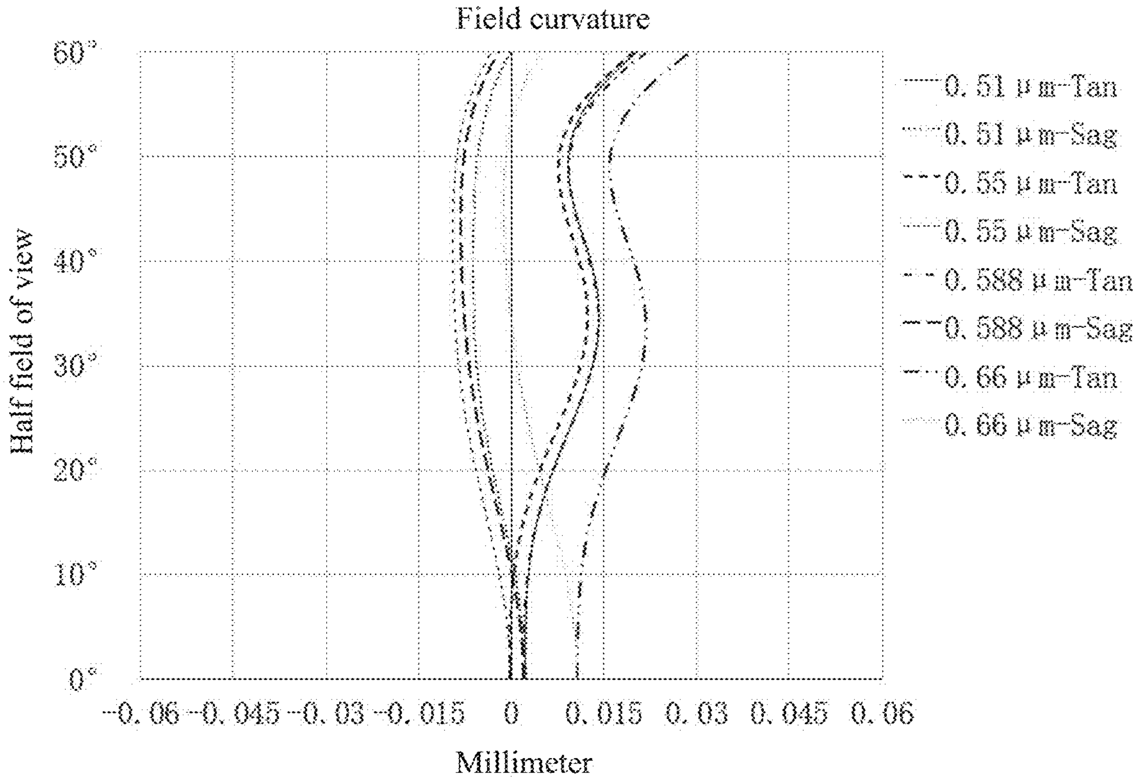
FIG. 12 is a graph of field curvatures of the optical lens according to Embodiment 3 of the present disclosure.
Figure 13:
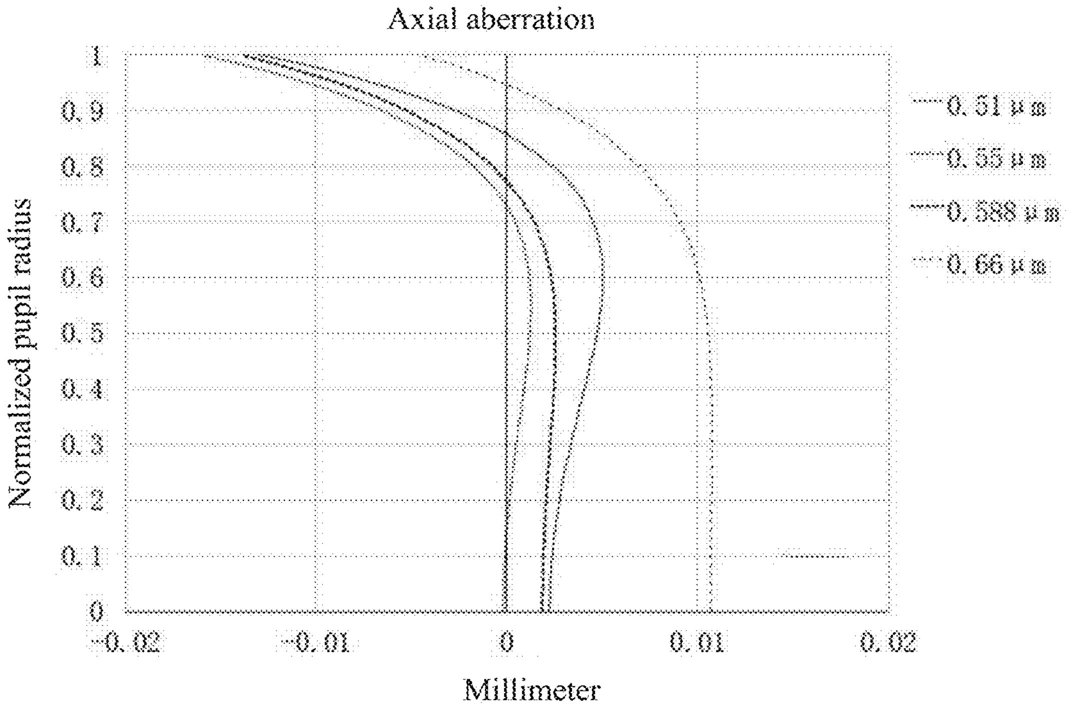
FIG. 13 is a graph of axial aberrations of the optical lens according to Embodiment 3 of the present disclosure.
Figure 14:
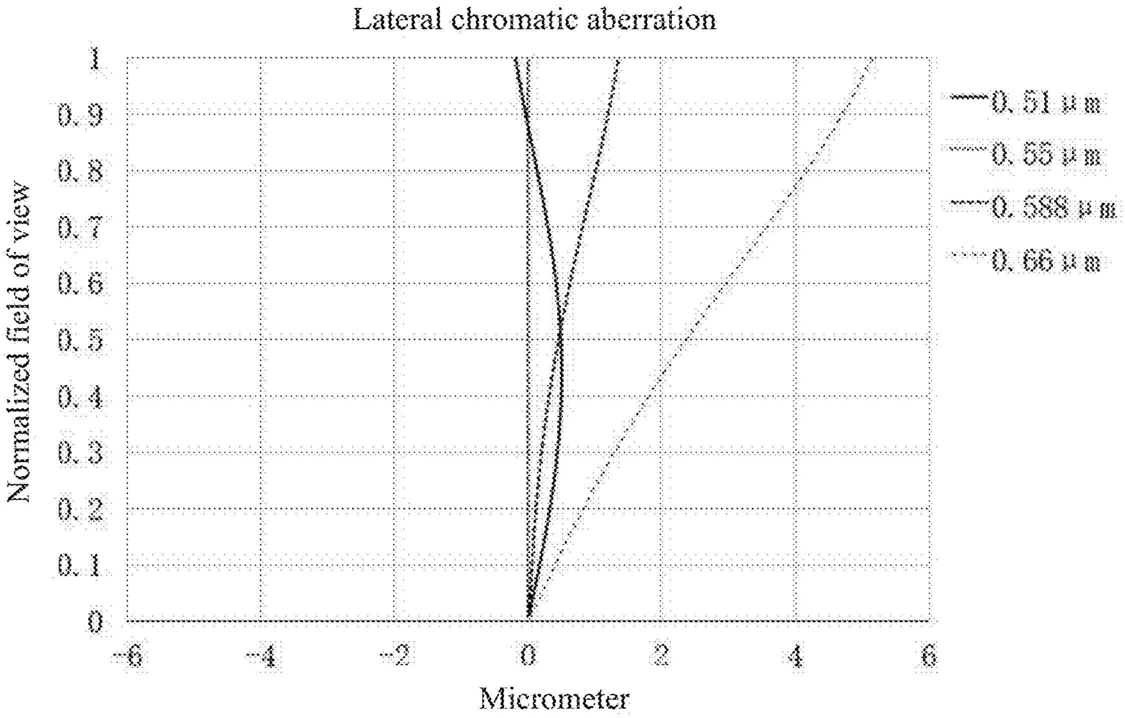
FIG. 14 is a graph of lateral chromatic aberrations of the optical lens according to Embodiment 3 of the present disclosure.
Figure 15:
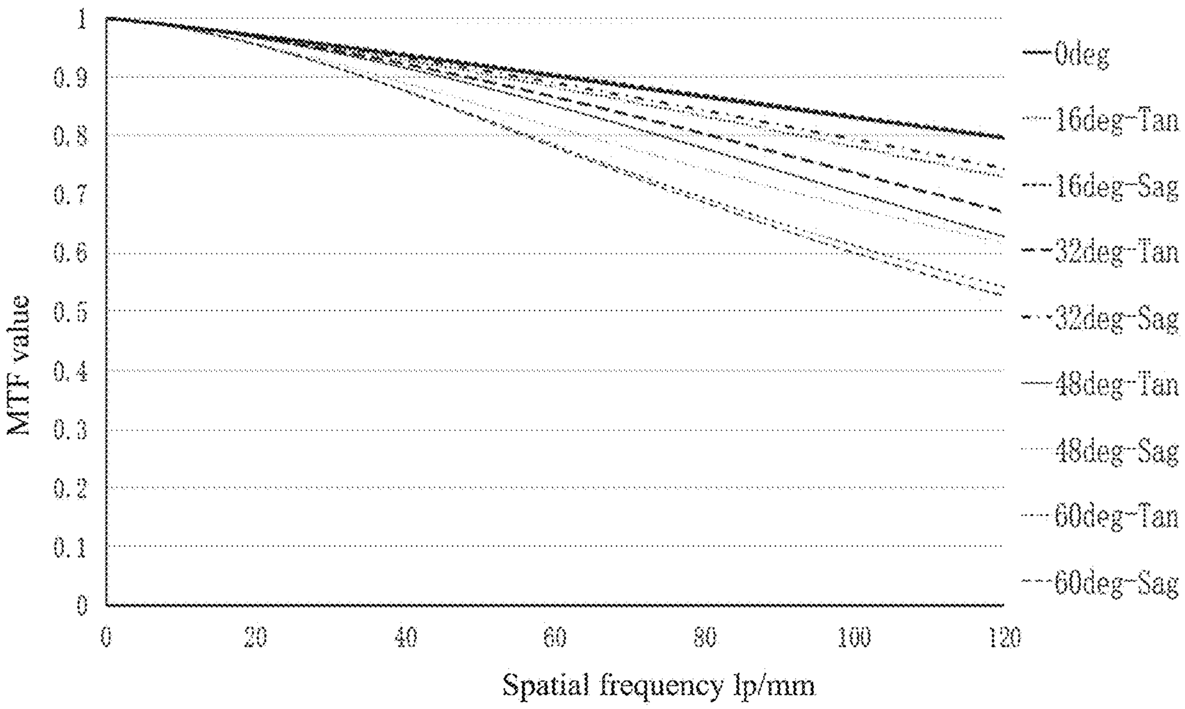
FIG. 15 is a graph of MTF of the optical lens according to Embodiment 3 of the present disclosure.

In the embodiment, the field curvature curves of the optical lens are shown in FIG. 12, the axial aberration curves of the optical lens are shown in FIG. 13, the lateral chromatic aberration curves of the optical lens are shown in FIG. 14, and the MTF curves of the optical lens are shown in FIG. 15.

The field curvature curves of Embodiment 3 are illustrated in FIG. 12, which represent curvature degrees of light at different wavelengths on a meridional plane and a sagittal plane. The horizontal axis represents an offset (unit: millimeter), and the vertical axis represents a half field of view (unit: degree)) (°. It can be seen from the graph that the field curvatures of the meridional plane and the sagittal plane are within +0.03 mm, which shows that the field curvatures of the optical lens are well corrected.

The axial aberration curves of Embodiment 3 are illustrated in FIG. 13, which represent aberrations on the optical axis at the imaging plane. The horizontal axis represents the axial aberration (unit: millimeter), and the vertical axis represents the normalized pupil radius. It can be seen from the graph that an offset of the axial aberration is within +0.02 mm, which shows that optical lens can effectively correct the axial aberration thereof.

The lateral chromatic aberration curves of Embodiment 3 are illustrated in FIG. 14, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within +6 μm, which shows that the optical lens can effectively correct the chromatic aberration of the edge field of view and the secondary spectrum of the entire imaging plane.

The MTF curves of Embodiment 3 are illustrated in FIG. 15, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-120) lp/mm, the MTF curves uniformly and smoothly decrease from the center to the edge field of view. A good imaging quality and a good detail resolution capability are all enabled at either a low frequency or a high frequency.

Embodiment 4

Figure 16:
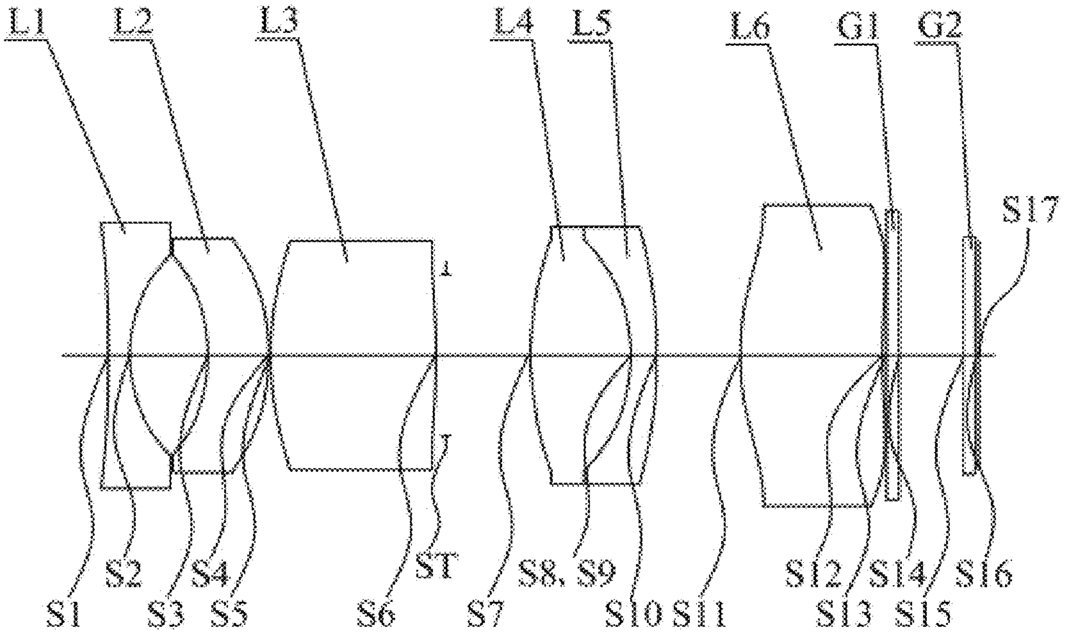
FIG. 16 is a schematic view illustrating a structure of an optical lens according to Embodiment 4 of the present disclosure.

Referring to FIG. 16, the structure of the optical lens provided in Embodiment 4 of the present disclosure is illustrated. From an object side to an imaging plane along an optical axis, the optical lens sequentially includes: a first lens L1, a second lens L2, a third lens L3, a stop ST, a fourth lens L4, a fifth lens L5, a sixth lens L6, a filter G1 and a protective glass G2.

The first lens L1 has a negative refractive power. The object side surface S1 of the first lens L1 is concave, and the image side surface S2 of the first lens is concave. The second lens L2 has a negative refractive power. The object side surface S3 of the second lens L2 is concave, and the image side surface S4 of the second lens L2 is convex. The third lens L3 has a positive refractive power. Both the object side surface S5 and the image side surface S6 of the third lens L3 are convex. Then is the stop ST. The fourth lens L4 has a positive refractive power. Both the object side surface S7 and the image side surface S8 of the fourth lens L4 are convex. The fifth lens L5 has a negative refractive power. The object side surface S9 of the fifth lens L5 is concave, and the image side surface S10 of the fifth lens L5 is convex. The sixth lens L6 has a positive refractive power. The object side surface S11 of the sixth lens L6 is convex, and the image side surface S12 of the sixth lens L6 is concave. The fourth lens L4 and the fifth lens L5 may be cemented to form a cemented lens.

The relevant parameters of each lens in the optical lens provided in Embodiment 4 of the present disclosure are shown in Table 4-1.

TABLE 4-1

| Surface No. | | Surface type | Radius of curvature R (mm) | Thickness D/ Distance L(mm) | Refractive index Nd | Abbe number Vd |
|---|---|---|---|---|---|---|
| | Object plane | Plane | Infinity | Infinity | | |
| S1 | First lens | Spherical surface | −71.91 | 1.00 | 1.84 | 42.73 |
| S2 | | Spherical surface | 6.46 | 3.59 | | |
| S3 | Second lens | Spherical surface | −7.19 | 2.78 | 1.73 | 54.67 |
| S4 | | Spherical surface | −9.13 | 0.10 | | |
| S5 | Third lens | Spherical surface | 14.61 | 7.57 | 1.91 | 35.25 |
| S6 | | Spherical surface | −48.15 | 0.51 | | |
| ST | Stop | Plane | Infinity | 3.89 | | |
| S7 | Fourth lens | Spherical surface | 14.95 | 4.61 | 1.60 | 65.46 |
| S8/S9 | Fifth lens | Spherical surface | −7.62 | 1.14 | 1.95 | 17.94 |
| S10 | | Spherical surface | −23.08 | 3.96 | | |
| S11 | Sixth lens | Aspheric surface | 14.33 | 6.49 | 1.81 | 40.73 |
| S12 | | Aspheric surface | 44.26 | 0.16 | | |

TABLE 4-1-continued

| Surface No. | | Surface type | Radius of curvature R (mm) | Thickness D/ Distance L(mm) | Refractive index Nd | Abbe number Vd |
|---|---|---|---|---|---|---|
| S13 | Filter | Plane | Infinity | 0.54 | 1.52 | 64.20 |
| S14 | | Plane | Infinity | 3.02 | | |
| S15 | Protective | Plane | Infinity | 0.54 | 1.52 | 64.20 |
| S16 | glass | Plane | Infinity | 0.14 | | |
| S17 | Imaging plane | Plane | Infinity | | | |

The parameters of surfaces of the aspheric lenses in the optical lens provided in Embodiment 4 of the present disclosure are shown in Table 4-2.

TABLE 4-2

| Surface No. | K | A | B | C | D | E | F |
|---|---|---|---|---|---|---|---|
| S11 | −1.29 | 0.00E+00 | −1.54E−04 | −2.05E−06 | 5.10E−08 | −1.99E−09 | 1.33E−11 |
| S12 | 11.10 | 0.00E+00 | −3.93E−04 | −5.11E−06 | 3.77E−08 | 3.64E−10 | −3.04E−12 |

Figure 17:
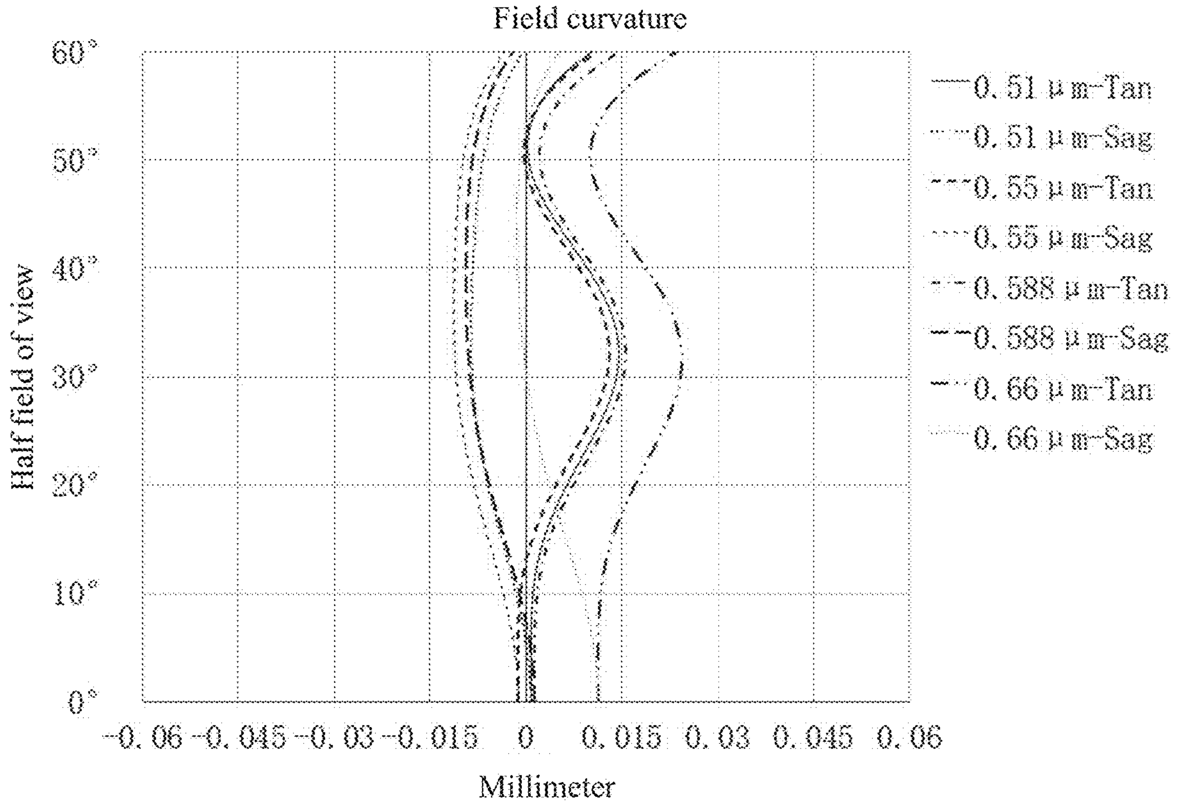
FIG. 17 is a graph of field curvatures of the optical lens according to Embodiment 4 of the present disclosure.
Figure 18:
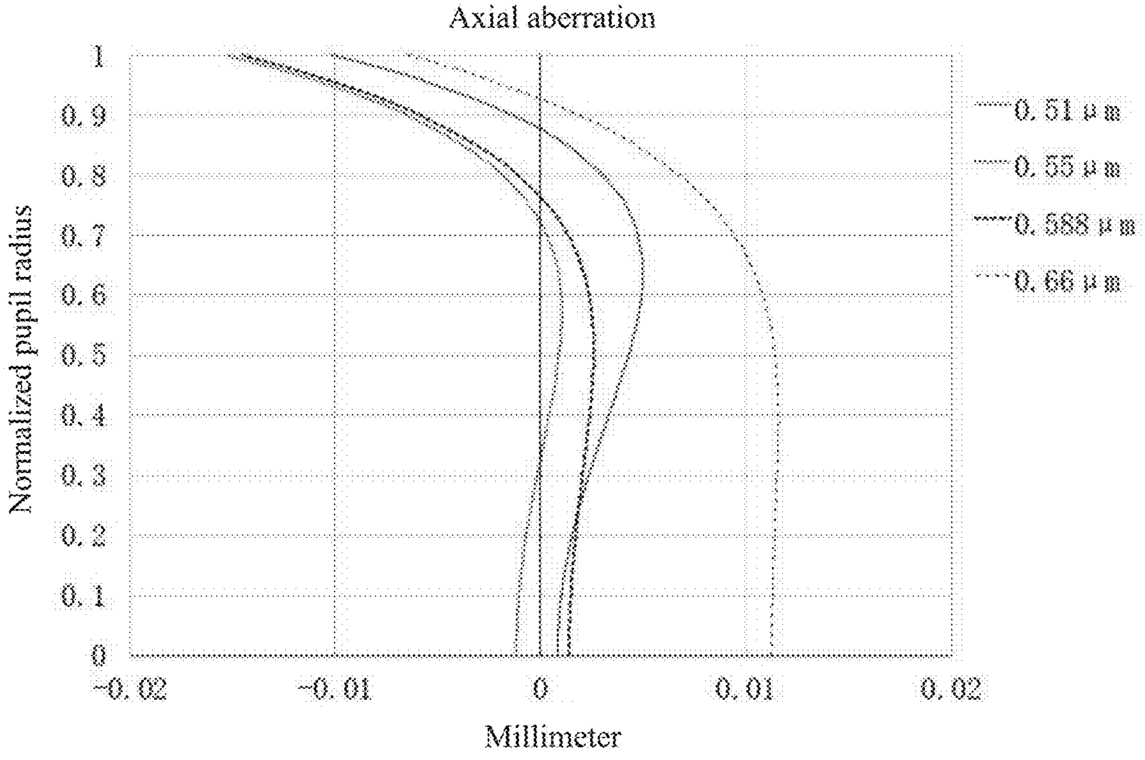
FIG. 18 is a graph of axial aberrations of the optical lens according to Embodiment 4 of the present disclosure.
Figure 19:
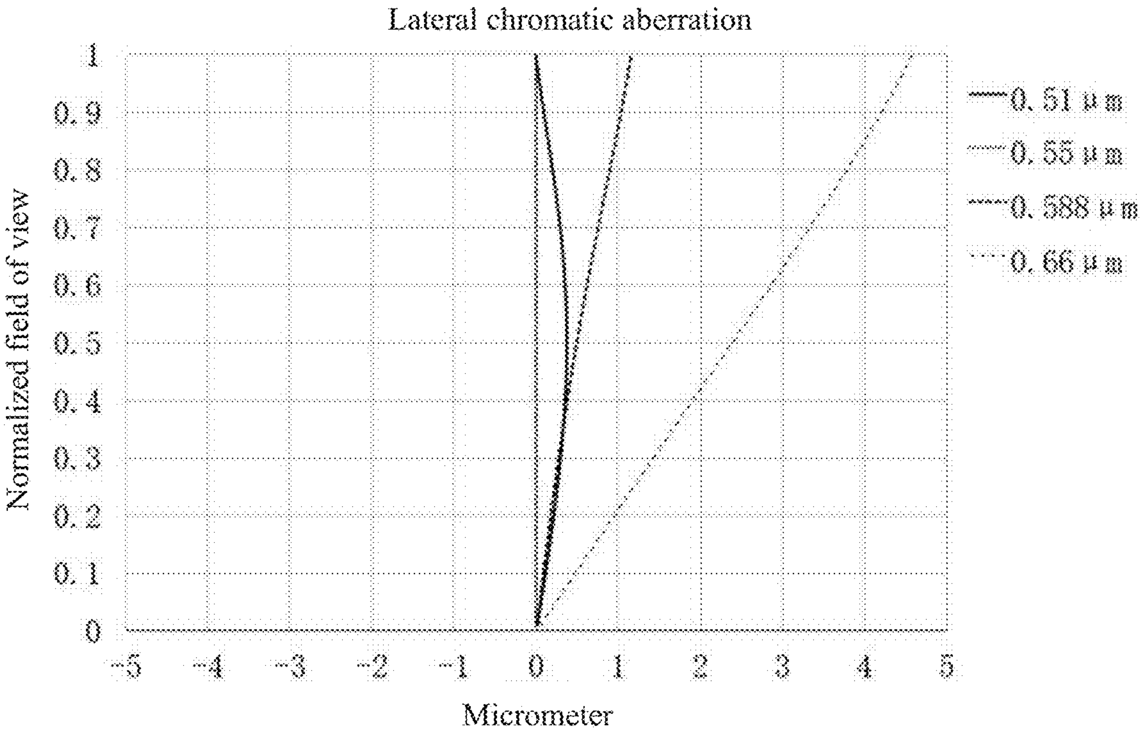
FIG. 19 is a graph of lateral chromatic aberrations of the optical lens according to Embodiment 4 of the present disclosure.
Figure 20:
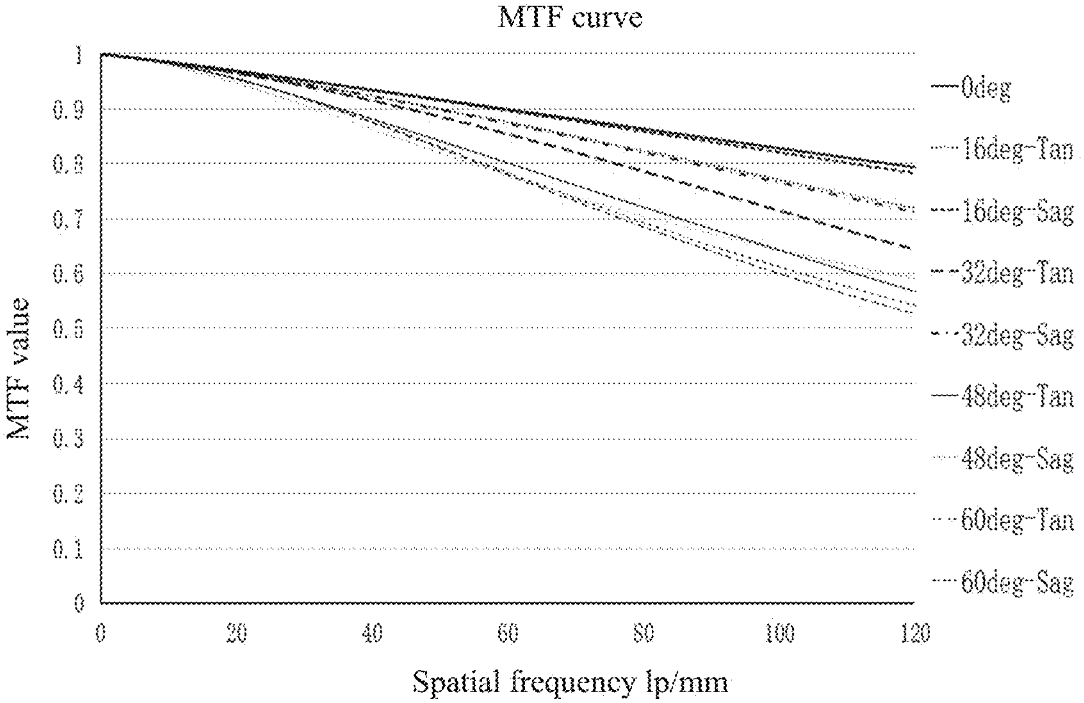
FIG. 20 is a graph of MTF of the optical lens according to Embodiment 4 of the present disclosure.

In the embodiment, the field curvature curves of the optical lens are shown in FIG. 17, the axial aberrations curves of the optical lens are shown in FIG. 18, the lateral chromatic aberration curves of the optical lens are shown in FIG. 19, and the MTF curves of the optical lens are shown in FIG. 20.

The field curvature curves of Embodiment 4 are illustrated in FIG. 17, which represent curvature degrees of light at different wavelengths on a meridional plane and a sagittal plane. The horizontal axis represents an offset (unit: millimeter), and the vertical axis represents a half field of view (unit: degree)) (°. It can be seen from the graph that the field curvatures of the meridional plane and the sagittal plane are within +0.03 mm, which shows that the field curvatures of the optical lens are well corrected.

The axial aberration curves of Embodiment 4 are illustrated in FIG. 18, which represent aberrations on the optical axis at the imaging plane. The horizontal axis represents the axial aberration (unit: millimeter), and the vertical axis represents the normalized pupil radius. It can be seen from the graph that an offset of the axial aberration is within +0.02 mm, which shows that optical lens can effectively correct the axial aberration thereof.

The lateral chromatic aberration curves of Embodiment 4 are illustrated in FIG. 19, which represent chromatic aberrations of various wavelengths, relative to a center wavelength (0.55 μm), at different image heights on the imaging plane. The horizontal axis represents the lateral chromatic aberrations (unit: micrometer) of each wavelength relative to the center wavelength, and the vertical axis represents a normalized field of view. It can be seen from the graph that the lateral chromatic aberrations of the longest wavelength and the shortest wavelength are all within +5 μm, which shows that the optical lens can effectively correct the chromatic aberration of the edge field of view and the secondary spectrum of the entire imaging plane.

The MTF curves of Embodiment 4 are illustrated in FIG. 20, which represent imaging modulation of the optical lens at different spatial frequencies and different fields of view. The horizontal axis represents spatial frequency (unit: lp/mm), and the vertical axis represents MTF value. It can be seen from the graph that the MTF values in the embodiment are all above 0.5 in the full field of view. In a range of (0-120) lp/mm, the MTF curves uniformly and smoothly decrease from the center to the edge field of view. A good imaging quality and a good detail resolution capability are all enabled at either a low frequency or a high frequency.

Referring to Table 5, the optical characteristics of the above embodiments are illustrated, including the effective focal length f of the optical lens, the total track length TTL, the f-number FNO, the true image height IH, the field of view FOV, and values of the expressions corresponding to the embodiments.

TABLE 5

| Parameters & Expression | Embodiment 1 | Embodiment 2 | Embodiment 3 | Embodiment 4 |
|---|---|---|---|---|
| f (mm) | 5.96 | 5.98 | 5.99 | 6.45 |
| TTL (mm) | 40.00 | 40.00 | 40.02 | 40.03 |
| FNO | 1.80 | 1.74 | 1.74 | 1.88 |
| IH (mm) | 10.06 | 9.61 | 9.62 | 10.38 |
| FOV (°) | 120 | 120 | 120 | 120 |
| CRA (°) | 4.86 | 1.75 | 6.08 | 0.21 |
| f/IH | 0.59 | 0.62 | 0.62 | 0.62 |
| ΣCT/TTL | 0.66 | 0.57 | 0.61 | 0.62 |
| HD1/D1 | 0.53 | 0.55 | 0.56 | 0.58 |
| f1/f | −1.19 | −1.15 | −1.12 | −1.09 |
| f2/f | −14.35 | −11.88 | −17.06 | −18.11 |
| f3/f | 2.07 | 2.19 | 2.08 | 2.01 |
| f4/f | 1.82 | 1.52 | 1.50 | 1.40 |
| f5/f | −2.13 | −2.01 | −1.86 | −1.91 |
| f6/f | 3.32 | 3.21 | 2.89 | 3.70 |
| (R1 + R2)/(R1 − R2) | 0.85 | 0.85 | 0.81 | 0.84 |
| R3/(R4 + CT2) | 1.15 | 1.08 | 1.16 | 1.13 |
| R5/f3 | 1.21 | 1.22 | 1.19 | 1.13 |
| R10/(R9 + f5) | 1.14 | 1.33 | 1.23 | 1.16 |
| (R11 + R12)/(R11 − R12) | −1.58 | −1.13 | −1.88 | −1.96 |
| CT3/TTL | 0.26 | 0.10 | 0.18 | 0.19 |
| CT4/TTL | 0.12 | 0.11 | 0.12 | 0.12 |
| CT6/TTL | 0.11 | 0.20 | 0.14 | 0.16 |

In summary, in the embodiments of the present disclosure, by reasonably matching lens shapes among the lenses and combining the refractive power of various lenses, a large aperture, a large field of view and a high resolution of the optical lens are enabled.

The foregoing embodiments only illustrate several implementations of the present disclosure, and their descriptions are relatively specific and detailed, but they cannot be construed as limiting the scope of the present disclosure. It is notable for those skilled in the art that, several variations and modifications may be made by those skilled in the art without departing from the concept of the present disclosure, and all of them should fall within the protection scope of the present disclosure. Accordingly, the protection scope of the present disclosure is subject to the appended claims.

What is claimed is:

1. An optical lens, comprising a total of six lenses, wherein from an object side to an imaging plane along an optical axis of the optical lens, the optical lens sequentially comprises:

a first lens with a negative focal power, both an object side surface of the first lens and an image side surface of the first lens being concave;

a second lens with a negative focal power, an object side surface of the second lens being concave, and an image side surface of the second lens being convex;

a third lens with a positive focal power, both an object side surface and an image side surface of the third lens being convex;

a fourth lens with a positive focal power, both an object side surface and an image side surface of the fourth lens being convex;

a fifth lens with a negative focal power, an object side surface of the fifth lens being concave, and an image side surface of the fifth lens being convex; and a sixth lens with a positive focal power, an object side surface of the sixth lens being convex, and an image side surface of the sixth lens being concave;

wherein the fourth lens and the fifth lens are cemented to form a cemented lens;

an effective focal length f of the optical lens and a true image height IH corresponding to a maximum field of view of the optical lens meet an expression: $0.55<f/IH<0.65$; and an aperture HD1 of the object side surface of the first lens corresponding to half of the maximum field of view of the optical lens and an aperture D1 of the object side surface of the first lens corresponding to the maximum field of view meet an expression: $0.5<HD1/D1<0.6$.

2. The optical lens as claimed in claim 1, wherein the effective focal length f of the optical lens meets an expression: $5.9\ mm<f<6.5\ mm$.

3. The optical lens as claimed in claim 1, wherein the true image height IH corresponding to the maximum field of view of the optical lens meets an expression: $9.5\ mm<IH<10.5\ mm$.

4. The optical lens as claimed in claim 1, wherein an f-number of the optical lens meet an expression: $1.7<FNO<1.9$.

5. The optical lens as claimed in claim 1, wherein the effective focal length f of the optical lens and a focal length f1 of the first lens meet an expression: $-1.2<f1/f<-1.0$; and a radius of curvature R1 of the object side surface of the first lens and a radius of curvature R2 of the image side surface of the first lens meet an expression: $0.8<(R1+R2)/(R1-R2)<0.9$.

6. The optical lens as claimed in claim 1, wherein the effective focal length f of the optical lens and a focal length f2 of the second lens meet an expression: $-18.5<f2/f<-11.5$; and a radius of curvature R3 of the object side surface of the second lens, a radius of curvature R4 of the image side surface of the second lens, and a central thickness CT2 of the second lens meet an expression: $1.05<R3/(R4+CT2)<1.20$.

7. The optical lens as claimed in claim 1, wherein the effective focal length f of the optical lens, a focal length f3 of the third lens, and a radius of curvature R5 of the object side surface of the third lens meet expressions: $2.0<f3/f<2.2$ and $1.10<R5/f3<1.25$.

8. The optical lens as claimed in claim 1, wherein the effective focal length f of the optical lens and a focal length f4 of the fourth lens meet an expression: $1.2<f4/f<1.9$.

9. The optical lens as claimed in claim 1, wherein the effective focal length f of the optical lens and a focal length f5 of the fifth lens, a radius of curvature R9 of the object side surface of the fifth lens, and a radius of curvature R10 of the image side surface of the fifth lens meet expressions: $-2.2<f5/f<-1.8$, and $1.10<R10/(R9+f5)<1.35$.

10. The optical lens as claimed in claim 1, wherein the effective focal length f of the optical lens and a focal length f6 of the sixth lens meet an expression: $2.8<f6/f<3.9$; and a radius of curvature R11 of the object side surface of the sixth lens and a radius of curvature R12 of the image side surface of the sixth lens meet an expression: $-3.0<(R11+R12)/(R11-R12)<-1.0$.

* * * * *